(12) United States Patent
Miki et al.

(10) Patent No.: US 7,688,358 B2
(45) Date of Patent: Mar. 30, 2010

(54) IMAGE CAPTURING APPARATUS AND WHITE BALANCE PROCESSING APPARATUS

(75) Inventors: Takanori Miki, Kanagawa (JP); Kazunobu Takahashi, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 304 days.

(21) Appl. No.: 11/763,459

(22) Filed: Jun. 15, 2007

(65) Prior Publication Data

US 2008/0143845 A1 Jun. 19, 2008

(30) Foreign Application Priority Data

Dec. 14, 2006 (JP) .............................. 2006-337230

(51) Int. Cl.
  *H04N 9/73* (2006.01)
(52) U.S. Cl. .................................................. 348/223.1
(58) Field of Classification Search ................ 382/167; 348/223.1, 224.1, 225.1
  See application file for complete search history.

(56) References Cited

U.S. PATENT DOCUMENTS

| | | | | |
|---|---|---|---|---|
| 5,040,054 | A * | 8/1991 | Schmidt et al. | 348/225.1 |
| 5,282,022 | A * | 1/1994 | Haruki et al. | 348/223.1 |
| 5,289,268 | A * | 2/1994 | Suzuki et al. | 348/223.1 |
| 5,481,302 | A * | 1/1996 | Yamamoto et al. | 348/223.1 |
| 6,493,468 | B1 * | 12/2002 | Matsuura | 382/167 |
| 6,545,710 | B1 * | 4/2003 | Kubo et al. | 348/223.1 |
| 6,727,942 | B1 * | 4/2004 | Miyano | 348/223.1 |
| 2002/0080246 | A1 * | 6/2002 | Parulski | 348/225 |
| 2004/0119874 | A1 * | 6/2004 | Imai | 348/362 |
| 2006/0159340 | A1 * | 7/2006 | Lee | 382/169 |
| 2006/0165281 | A1 * | 7/2006 | Fujino | 382/167 |
| 2006/0221216 | A1 * | 10/2006 | Hattori | 348/254 |
| 2007/0285530 | A1 * | 12/2007 | Kim et al. | 348/223.1 |
| 2008/0291475 | A1 * | 11/2008 | Wong et al. | 358/1.9 |

FOREIGN PATENT DOCUMENTS

| | | |
|---|---|---|
| JP | 2000092509 | 3/2000 |
| JP | 2003023642 | 1/2003 |

\* cited by examiner

*Primary Examiner*—Jason Whipkey
(74) *Attorney, Agent, or Firm*—Thomas J. Strouse; Peyton C. Watkins

(57) ABSTRACT

There is provided a technique of preventing occurrence of a shift in white balance even when the ratio of a dark area is greater than the ratio of a bright area as in the case of a night view. A white balance gain calculator calculates white balance gains for an image from color of pixels whose luminance levels are at equal to or greater than a reference luminance level among all pixels of an image. When the ratio of dark pixels whose luminance satisfies a predetermined condition, among all pixels of the image, is equal to or greater than a reference ratio, a correction coefficient calculating section determines a correction coefficient from at least one of factors; namely, image-capturing sensitivity corresponding to an image, the ratio of dark pixels, and firing/non-firing of flash light; and instructs the white balance gain calculator to make a correction to the white balance gain in accordance with the correction coefficient.

10 Claims, 12 Drawing Sheets

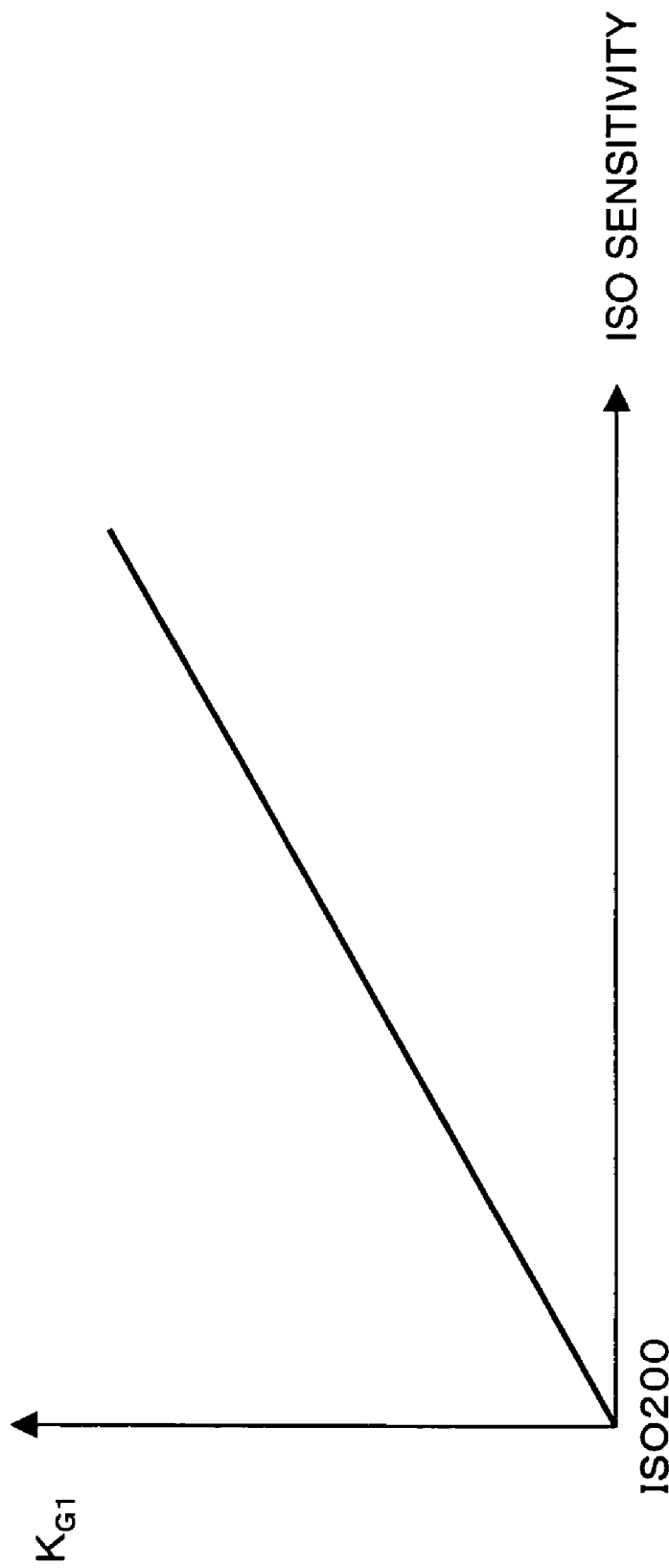

IMAGE CAPTURING APPARATUS AND WHITE BALANCE PROCESSING APPARATUS

CROSS REFERENCE TO RELATED APPLICATIONS

This application claims priority to Japanese Patent Application No. 2006-337230 filed on Dec. 14, 2006, which is incorporated herein by reference in its entirety.

FIELD OF THE INVENTION

The present invention relates to a technique of adjusting white balance of an image captured by means of an image-capturing apparatus, such as a digital still camera, a digital video camera, and the like.

BACKGROUND OF THE INVENTION

In an image-capturing apparatus, such as a digital still camera, a digital video camera, and the like, equipped with a solid-state imaging sensor such as a CCD image sensor, a CMOS image sensor, and the like, there is performed white balance adjustment for adjusting gains of RGB signals in accordance with the color temperature of a light source so that a white substance can be recorded as a substance of real white color through image-capturing.

Incidentally, a comparatively bright area and a comparatively dark area are mixedly present in an image captured by the image-capturing apparatus. When the gains of the RGB signals are adjusted in accordance with the dark area, there is a possibility of the color of the light source failing to be reflected on the adjustment. When information about the dark area is used for gain adjustment, the information may become a factor responsible for an error in color reproduction.

Japanese Patent Laid-Open Publication No. 2000-92509 describes a technique of preventing the information about a dark area, to which the color of the light source is considered not to be reflected much, from affecting the adjustment of a gain for white balance. More specifically, Japanese Patent Laid-Open Publication No. 2000-92509 describes a technique of: dividing an image into a plurality of blocks; taking, as a typical value of a block, an average value including luminance and a color difference of each of RGB components determined on a per-block basis and determining a block of the highest luminance among the blocks in accordance with the typical value; determining a luminance threshold value from the luminance of the block of the highest luminance; determining a gain from the typical value of a block, among all of the blocks, whose luminance is higher than the luminance threshold value; and adjusting white balance in accordance with the gain.

As mentioned above, gains determined by placing high priority on the information about a comparatively-bright area are imparted to the respective RGB signals pertaining to the entire image, and white balance adjustment is performed. When a characteristic (hereinafter called an "output characteristic") of the level of an output signal corresponding to the quantity of light entering a solid-state imaging sensor does not depend on the quantity of incident light but exhibits a linear relationship, color reproduction is not adversely affected much even when white balance is adjusted in connection with the RGB signal pertaining to the entire image by use of the gain determined by placing priority on the information about the comparatively-bright area (i.e., an area where the quantity of incident light is comparatively large).

However, for instance, in reality, the output characteristic of a dark area where the quantity of incident light is small becomes nonlinear. Consequently, when white balance of the entire image including a lot of dark areas; e.g., a night view, is adjusted by use of the gain determined by placing priority on the information about a bright area, there may arise a case where color reproduction of the dark areas is adversely affected.

Japanese Patent Laid-Open Publication No. 2003-23642 describes a technique of providing an image-capturing apparatus with linearity correction means which determines, in advance, reference data, representing an input/output characteristic of a CCD in the form of an approximate line, by means of measurement; which detects the level of an output from the CCD in accordance with the quantity of incident light; and which corrects the characteristic of the output from the CCD in accordance with the reference data, thereby improving a shift in white balance.

SUMMARY OF THE INVENTION

The present invention provides a technique of reducing a shift in white balance without directly correcting a characteristic of a signal output from a solid-state imaging sensor even in the case of an image where a proportion of a dark area, such as in a night view image, is larger than a proportion of a bright area.

The present invention provides an image-capturing apparatus comprising:

a solid-state imaging sensor which outputs a signal corresponding to a quantity of incident light;

a white balance gain calculator for calculating white balance gains of an image from at least color differences of pixels whose luminance is equal to or greater than reference luminance among all pixels forming the image originating from the output signal;

a white balance adjuster for adjusting white balance of the image in accordance with the calculated gains of white balance; and a gain correction instructing unit which performs a pixel determination as to whether or not a ratio of dark pixels, whose luminance is lower than the reference luminance and whose color differences fall within a predetermined correction target area in a color-difference space, to all pixels of the image is greater than or equal to a reference ratio, and instructs the white balance gain calculator to make a correction to the white balance gains in accordance with a predetermined correction coefficient when the ratio of dark pixels is equal to or greater than the reference ratio.

In one mode of the image-capturing apparatus of the present invention, the gain correction instructing unit does not perform the pixel determination for determining whether or not there is issued an instruction for making a correction to the white balance gains when image-capturing sensitivity corresponding to the image is lower than reference image-capturing sensitivity.

In one mode of the image-capturing apparatus of the present invention, the gain correction instructing unit does not perform the pixel determination for determining whether or not there is issued an instruction for making a correction to the white balance gains when subject luminance of the image is greater than reference subject luminance.

In one mode of the image-capturing apparatus of the present invention, the correction coefficient is determined from at least one of image-capturing sensitivity corresponding to the image, a proportion of dark pixels, and firing/non-firing of flash light.

In one mode of the image-capturing apparatus of the present invention, the correction coefficient is determined such that a ratio G/R of a G component to an R component in the image and a ratio G/B of the G component to a B component in the image increase.

The present invention provides a white balance processing apparatus comprising:

a white balance gain calculator for calculating white balance gains of an image from at least color differences of pixels whose luminance is equal to or greater than reference luminance among all pixels forming the image originating from the signal output from a solid-state imaging sensor in accordance with the quantity of incident light;

a white balance adjuster for adjusting white balance of the image in accordance with the calculated gains of white balance; and a gain correction instructing unit for instructing the white balance gain calculator to make a correction to the white balance gains in accordance with a predetermined correction coefficient when a ratio of dark pixels, whose luminance is smaller than the reference luminance and color differences fall within a predetermined correction target area of a color-difference space, to all pixels of the image is equal to or greater than a reference ratio.

According to the present invention, even in the case of an image where a ratio of dark areas is greater than a ratio of bright areas as in a night view, a shift in white balance can be reduced.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following figures, wherein:

FIG. 6A is a view showing an example reference map to which reference is made when a correction coefficient $K_G$ is determined;

DETAILED DESCRIPTION OF THE PREFERRED EMBODIMENT

An embodiment specifically showing the best mode for implementing the present invention will be described hereinbelow by reference to the drawings.

Figure 1:
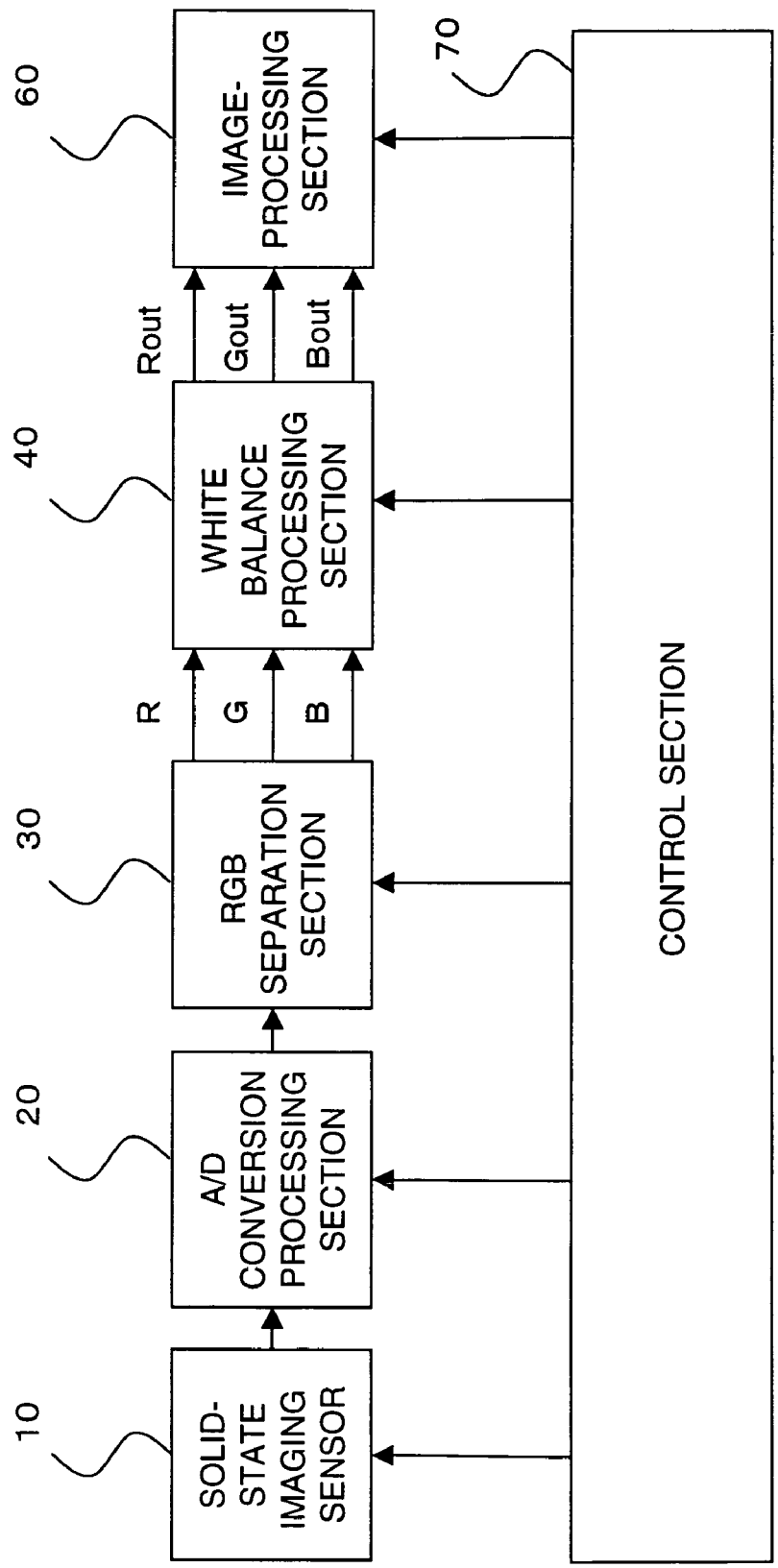
FIG. 1 is a view showing functional blocks of an image-capturing apparatus of an embodiment of the present invention.

FIG. 1 is a drawing showing functional blocks of a digital camera of an embodiment of the present invention. Although the present embodiment is described by means of taking a consumer digital camera an example of an image-capturing apparatus, the present invention can be applied to cameras in other applications, such as a monitoring camera, a TV camera, and the like.

In FIG. 1, a solid-state imaging sensor 10 is an image sensor which outputs a signal corresponding to the quantity of incident light. For instance, a CCD image sensor and a CMOS image sensor are examples of the solid-state imaging sensor 10. The solid-state imaging sensor 10 has color filters, and the color filters; i.e., a red filter (R), a green filter (Gr) of a column R, a blue filter (B), and a green filter (Gb) of a column B, are arranged in, e.g., a Bayer arrangement. The solid-state imaging sensor 10 outputs an R signal which is a signal from pixels of the red filter (R), a Gr signal which is a signal from pixels of the green filter (Gr) of the column R, a B signal which is a signal from pixels of the blue filter (B), and a Gb signal which is a signal from pixels of the green filter (Gb) of the column B. The R signal, the Gr signal, the B signal, and the Gb signal are hereinafter collectively called color signals.

An A/D conversion processing section 20 subjects the color signals to correlated double sampling (CDS), to thus eliminate amplifier noise or reset noise; subsequently adjusts gains of the color signals corresponding to the quantity of light entering the solid-state imaging sensor 10 (the luminance of a subject); converts the color signals from analog signals to digital signals; and outputs the converted digital signals.

An RGB separation section 30 separates color signals for one frame input from the A/D conversion processing section 20 from one color component to another color component; and outputs the components as an R signal, a G signal, and a B signal (hereinafter generically called "RGB signals").

A white balance processing section 40 imparts gains corresponding to the light source to the respective RGB signals, thereby adjusting white balance of the RGB signals. Details of the white balance processing section 40 will be described later.

An image-processing section 60 subjects the RGB signals, which have undergone white balance adjustment, to predetermined image processing such as pixel interpolation, edge processing, γ correction, and the like; and outputs the processed signals as a video signal to a display device such as a liquid-crystal screen or the like or stores the signals as image data in a recording medium. A control section 70 is a microprocessor for controlling the individual sections mentioned above. Although in the above description image processing such as pixel interpolation or the like is performed after adjustment of white balance, image processing may also be performed before adjustment of white balance.

Subsequently, the white balance processing section 40 will be described in further detail.

Figure 2:
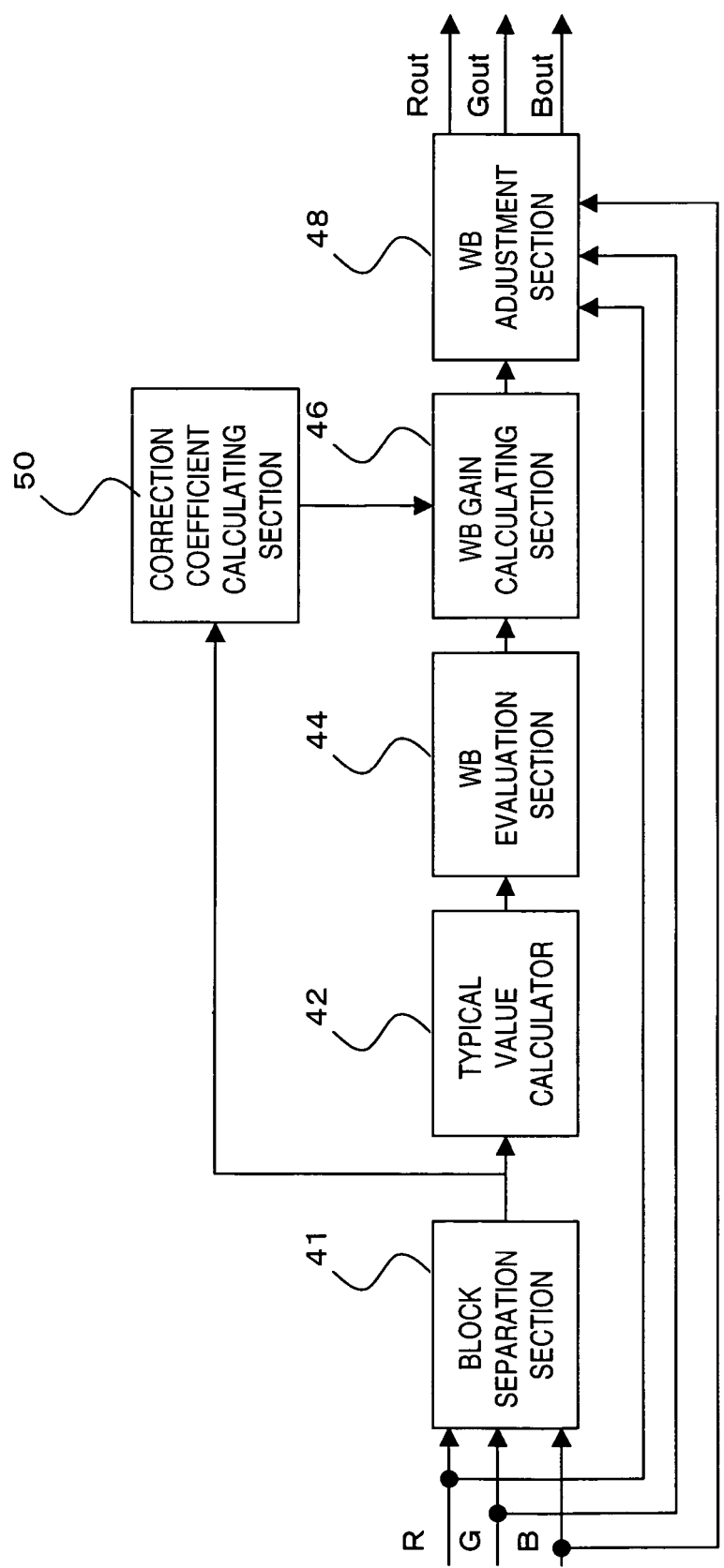
FIG. 2 is a view showing detailed functional blocks of a white balance processing section of the embodiment.

FIG. 2 is a view showing detailed functional blocks of the white balance processing section 40. The white balance processing section 40 provided in the following descriptions is a mere example. For instance, the white balance processing section may also be embodied as another circuit, so long as the circuit extracts, from all pixels forming an image, pixels estimated to reflect the color of the light source in accordance with predetermined conditions, sets white balance gains in accordance with an integral value of RGB signals pertaining to the extracted pixels, and adjusts white balance in accordance with the gains. Alternatively, RGB signals for one frame are defined as one image signal for the sake of explanation.

The present embodiment is characterized in that the white balance processing section 40 is equipped with a correction coefficient calculating section 50 for calculating a correction coefficient used for making correction on the white balance gains calculated by a white balance gain calculator 46 by means of a given technique. First, individual sections other than the correction coefficient calculating section 50 will be described.

A block division section 41 acquires a single image signal from the RGB signals for one frame, and divides the image signal into a plurality of blocks. Each of the blocks is constituted of n×m pixels. The block division section 41 sequentially outputs the blocks to a typical value calculator 42. The typical value calculator 42 calculates average RGB values of n×m pixels constituting each of the blocks, and subjects the block average value to linear conversion to be described below, thereby calculating typical values (Tl, Tg, and Ti).

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad (1)$$

Here, reference symbol Tl designates typical luminance of a block, and reference symbols Tg and Ti designate typical color differences of the block. The typical value calculator 42 outputs calculated typical values (Tl, Tg, Ti) of each of the blocks are output to a white balance evaluation section 44.

The white balance evaluation section 44 determines, from among blocks, a block of highest luminance; determines a luminance threshold value from the luminance of the block of highest luminance; and determines, from all of blocks, blocks having luminance levels higher than the luminance threshold value as blocks reflecting the light source. Moreover, the white balance evaluation section 44 determines the degree of reliability at which previously-presumed light sources illuminate the blocks determined to reflect the light sources. Next, the white balance evaluation section 44 calculates a weighting coefficient corresponding to the degree of reliability, and outputs the calculated weighting coefficient to the white balance gain calculator 46. The white balance gain calculator 46 subjects the typical values of the respective blocks to weighted averaging by use of the weighting coefficients determined from the degrees of reliability of the respective blocks calculated by the white balance evaluation section 44, thereby calculating white balance gains. Specifically, the white balance gains are calculated according to the equations provided below.

$$\begin{pmatrix} RMix \\ GMix \\ BMix \end{pmatrix} = \begin{pmatrix} 1 & -1 & -1 \\ 1 & 1 & 0 \\ 1 & -1 & 1 \end{pmatrix} \begin{pmatrix} TlMix \\ TgMix \\ TiMix \end{pmatrix} \quad (2)$$

$$MaxMix = \max(RMix, GMix, BMix) \quad (3)$$

$$Rgain = MaxMix/RMix$$

$$Ggain = MaxMix/GMix$$

$$Bgain = MaxMix/BMix \quad (4)$$

TlMix, TgMix, and TiMix designate weighted average values of the typical values of the respective blocks. (RMix, GMix, and BMix) calculated by the expressions correspond to the color of the light source that illuminates a subject. White balance gains (Rgain, Ggain, and Bgain) are set such that the color acquired when the estimated color of the light source is reflected by a white substance is corrected to gray (i.e., R=G=B). The white balance gain calculator 46 outputs calculated gains to a white balance adjuster 48. The white balance adjuster 48 multiplies the R signal, the G signal, and the B signal output from the RGB separation section 30 by the gains calculated by the white balance gain calculator 46, thereby adjusting white balance of an image signal. Consequently, the white balance adjuster 48 produces outputs (Rout, Gout, Bout) determined by the following equation.

$$Rout = Rgain*R$$

$$Gout = Ggain*G$$

$$Bout = Bgain*B \quad (5)$$

As mentioned previously, the white balance processing section 40 sets white balance gains in accordance with a result of estimation of the light source that illuminates the subject, and adjusts white balance in accordance with the gains.

The possibility of a block having high luminance (i.e., a block having a large quantity of incident light) reflecting the color of the light source is generally high. Consequently, the color of the light source is estimated by using a block of high luminance in preference to a block of low luminance, and gains are determined from a result of determination, whereby white balance can be adjusted and colors can be reproduced appropriately. However, for instance, when the quantity of incident light is small, an output characteristic of the level of an output corresponding to the quantity of light entering the solid-state imaging sensor 10 becomes nonlinear. Hence, when white balance of the entire image is adjusted in accordance with the gains determined by use of the blocks of high luminance in a prioritized manner, there may arise a case where reproduction of colors of dark areas in the image is adversely affected.

Figure 3A:
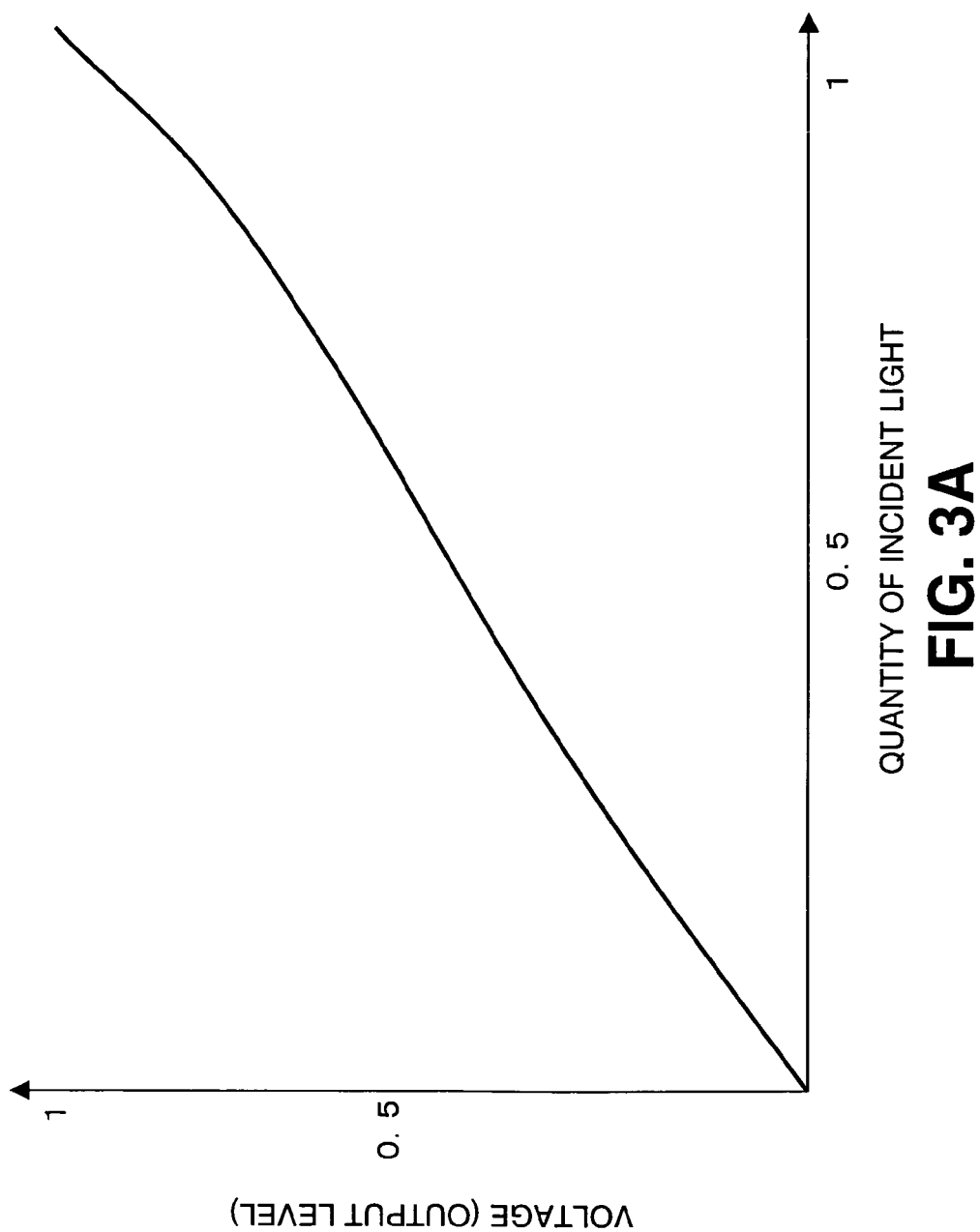
FIG. 3A is a view for describing an output characteristic of the level of an output signal corresponding to the quantity of light entering a solid-state imaging sensor.
Figure 3B:
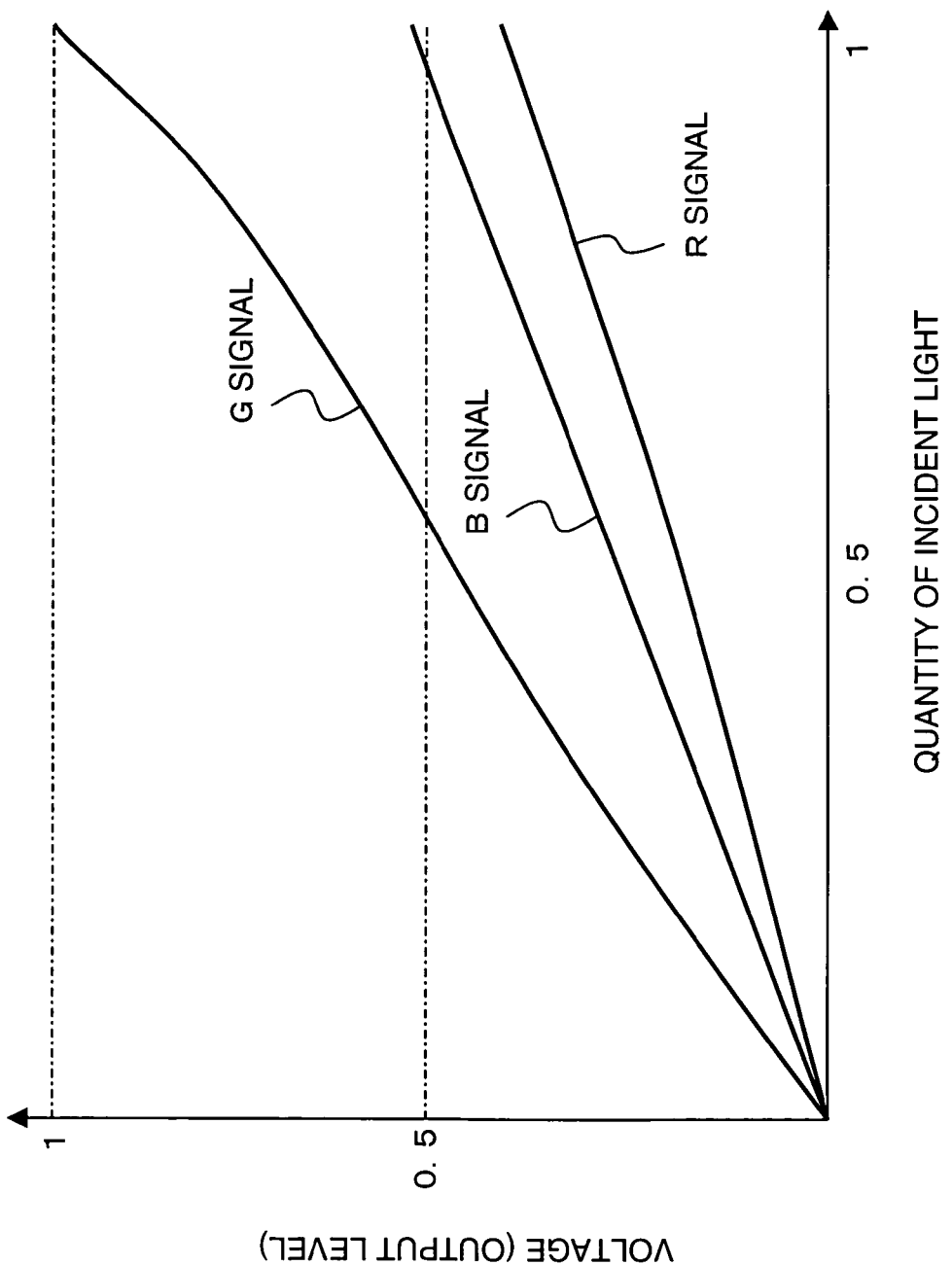
FIG. 3B is a view for describing an output level of an R signal, an output level of a G signal, and an output level of a B signal corresponding to the quantity of incident light.
Figure 3C:
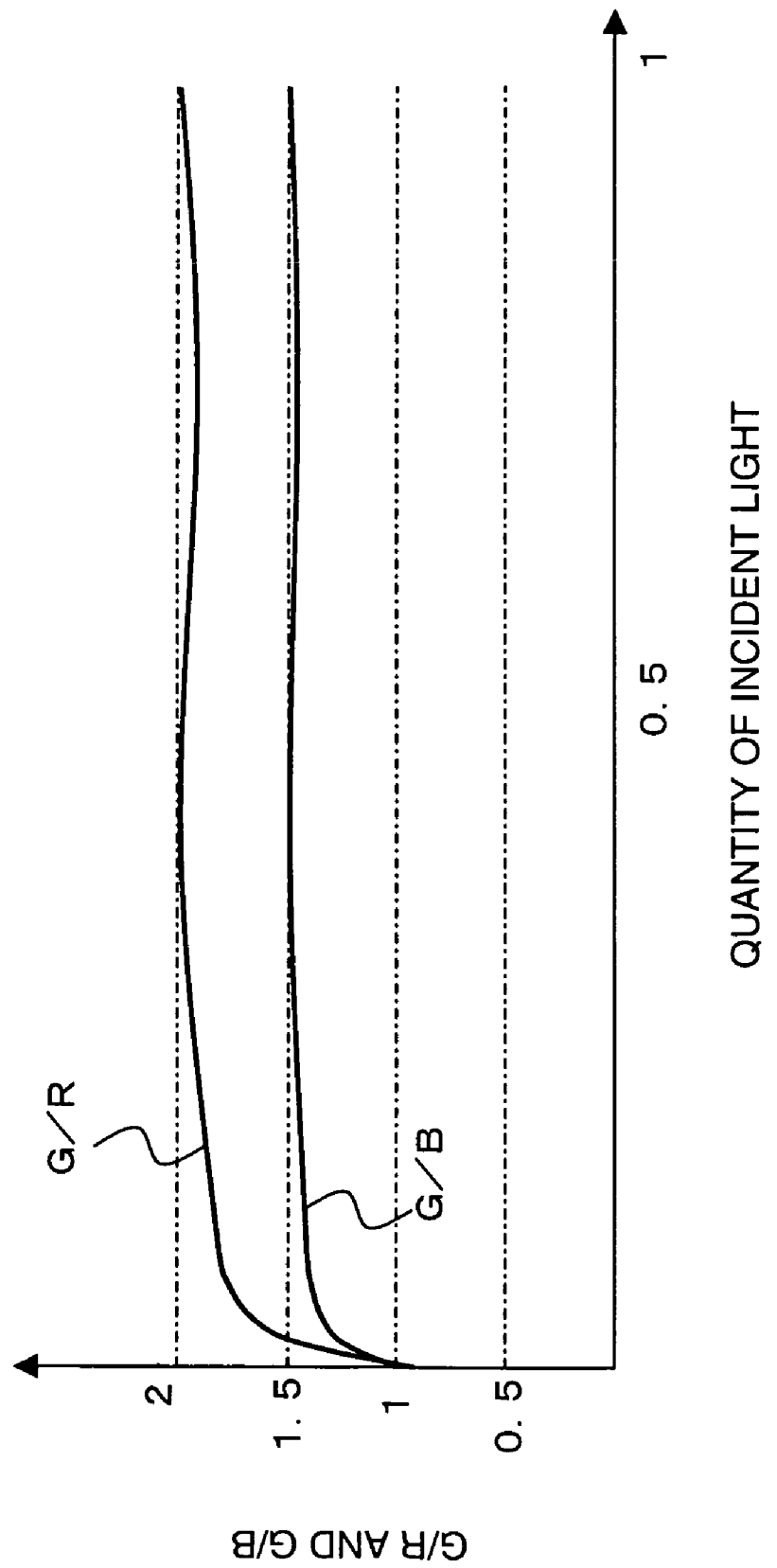
FIG. 3C is a view for describing G/R and G/B.

For instance, as shown in FIG. 3A, in a solid-state imaging sensor such as a CCD image sensor, an output characteristic of an output level corresponding to the quantity of incident light becomes nonlinear, and the characteristic varies from an area having a large quantity of incident light to an area having a small quantity of incident light. Particularly, when image-capturing sensitivity indicated by an index such as ISO sensitivity is high, the tendency of an output characteristic becoming nonlinear becomes stronger. Moreover, the output level of the R signal, that of the G signal, and that of the B signal corresponding to the quantity of incident light exhibit, e.g., curves such as those shown in FIG. 3B, because of differences among spectral transmission factors of color filters provided for respective primary colors of the solid-state imaging sensor. Consequently, when the color of the light source is estimated by use of blocks having high luminance in a prioritized manner; gains at which an RGB ratio exhibits 1:1:1 are determined from the result of estimation in such a way that the color acquired when the color of the light source is reflected by a white substance is corrected to gray; and the RGB signals are multiplied by the gains, there will arise a case where the RGB ratio acquired in an area having a small quantity of incident light does not exhibit 1:1:1 and where white balance is deteriorated. Specifically, when the RGB signals exhibit such a characteristic as shown in FIG. 3B, a G/R ratio of a G component to an R component in the image signal and a G/B ratio of a G component to a B component in the image signal show curves such as those shown in FIG. 3C. As can be seen from this embodiment, the output level of the R signal (the B signal) becomes higher than the output level of the G signal in a dark area. The dark area in the image having undergone white balance adjustment shifts entirely toward a magenta color. In the case of an image having comparatively-small dark areas, in many cases ignoring such a shift in white balance does not raise any substantial problem in terms of image quality. However, in the case of an image including numerous comparatively-dark areas and having high contrast, as in the case of a night view, in many cases such a shift cannot be ignored in terms of image quality.

In the present embodiment, in order to reduce the shift in white balance in an image having numerous dark areas and high contrast, such as a night view (hereinafter called a "correction target image"), the correction coefficient calculating section 50 is provided.

The correction coefficient calculating section 50 performs determination processing for determining whether or not an image corresponding to an image signal output from the RGB separation section 30 is a correction target image. Moreover, when the image is a correction target image, there is performed correction coefficient calculating operation for calculating a correction coefficient used for making correction to white balance gains of the image.

Determination processing and correction coefficient calculating operation will be described hereunder by reference to the drawings.

Figure 4:
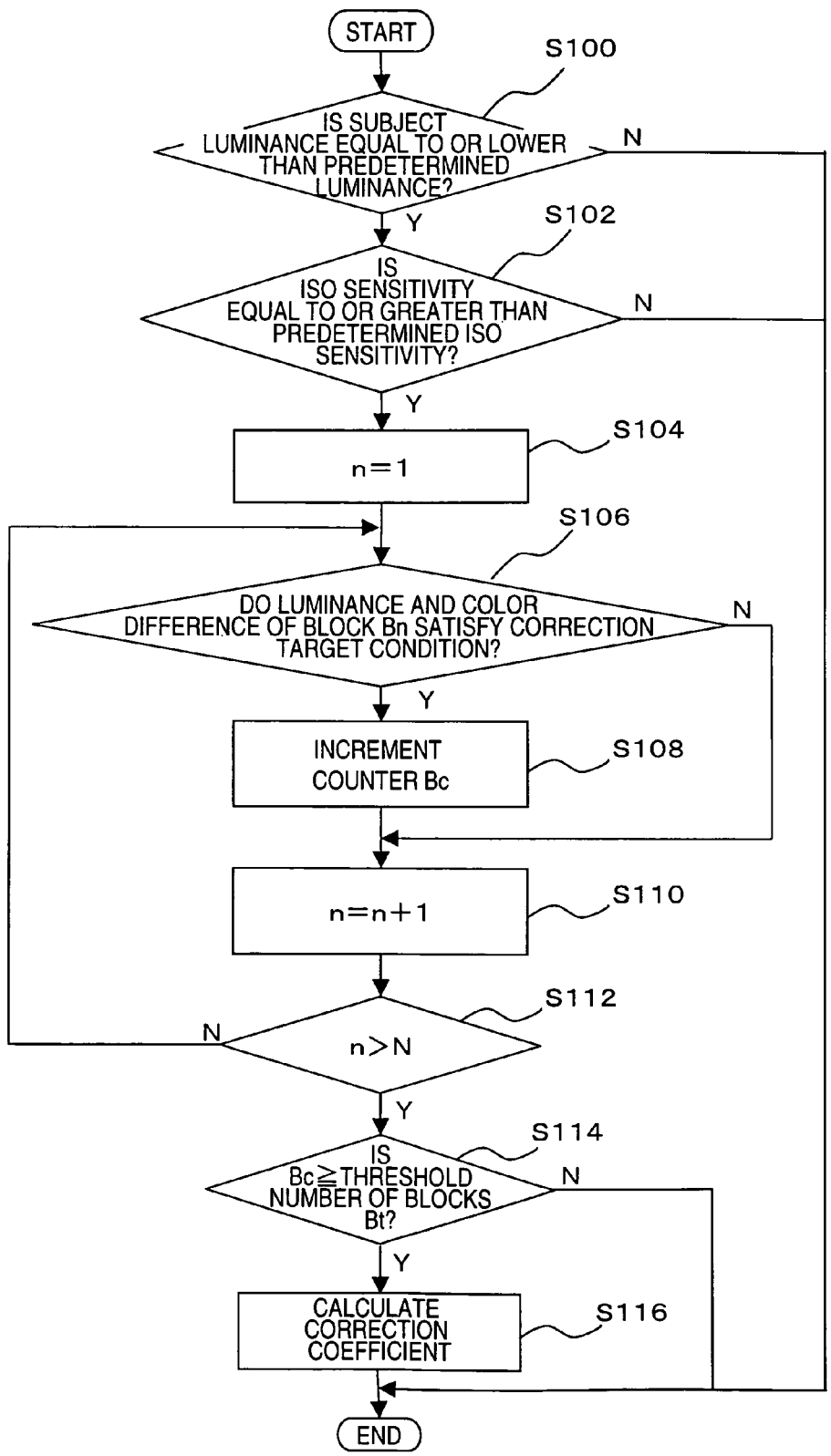
FIG. 4 is a flowchart showing processing procedures employed when a correction coefficient calculating section determines whether or not an image corresponding to an image signal is an object image of correction.

FIG. 4 is a flowchart showing procedures of determination processing performed by the correction coefficient calculating section 50.

In FIG. 4, the correction coefficient calculating section 50 acquires the luminance of a subject via a control section 70, and determines whether or not the luminance of the subject is equal to or less than a predetermined reference luminance of the subject (S100). The control section 70 detects the luminance of a subject from, e.g., an F value of a diaphragm of a digital camera, the level of a signal output from the solid-state imaging sensor 10, and the shutter speed of an electronic shutter. Moreover, the luminance of a subject is one of indices showing the degree of luminance of a photographic scene. Therefore, for instance, the essential requirement is to set the reference luminance of a subject as follows. Specifically, images of a plurality of scenes differing from each other in terms of the luminance of a subject; chiefly comparatively-dark scenes such as night views or indoor views, are captured. Subsequently, images determined to raise a problem of image quality because of a shift in white balance are selected from the images. An image having the highest subject luminance is extracted from the group of selected images. Subject luminance corresponding to the image is determined to be reference subject luminance.

When a result of determination shows that the subject luminance is equal to or greater than the reference subject luminance (when a result of determination rendered in step S100 is negative "N"), the risk of occurrence of a shift in white balance is determined to below, and processing is completed.

When the result of determination shows that the subject luminance is equal to or lower than the reference subject luminance (when the result of determination rendered in step S100 is affirmative "Y"), the correction coefficient calculating section 50 acquires image-capturing sensitivity achieved during photography by way of the control section 70, and determines whether or not the image-capturing sensitivity is equal to or greater than a predetermined reference image-capturing sensitivity (e.g., ISO 200) (S102). As mentioned above, the tendency of an output characteristic of the solid-state imaging sensor to become nonlinear becomes stronger with an increase in image-capturing sensitivity. Therefore, as image-capturing sensitivity becomes greater, the influence of the shift in white balance is estimated to be greater. Conversely, when image-capturing sensitivity is small, the influence of the shift in white balance is estimated to become smaller. Accordingly, when the result of determination shows that image-capturing sensitivity is lower than the reference image-capturing sensitivity (when the result of determination rendered in step S102 is negative "N"), the possibility of the shift in white balance is determined to be low, and processing is completed.

Meanwhile, when the result of determination shows that the image-capturing sensitivity is equal to or greater than the reference image-capturing sensitivity (when the result of determination rendered in step 102 is affirmative "Y"), the possibility of the shift in white balance is determined to be high, and a final determination is also made, in step S104 or a subsequent step, as to whether or not the image includes numerous dark areas.

Figure 5:
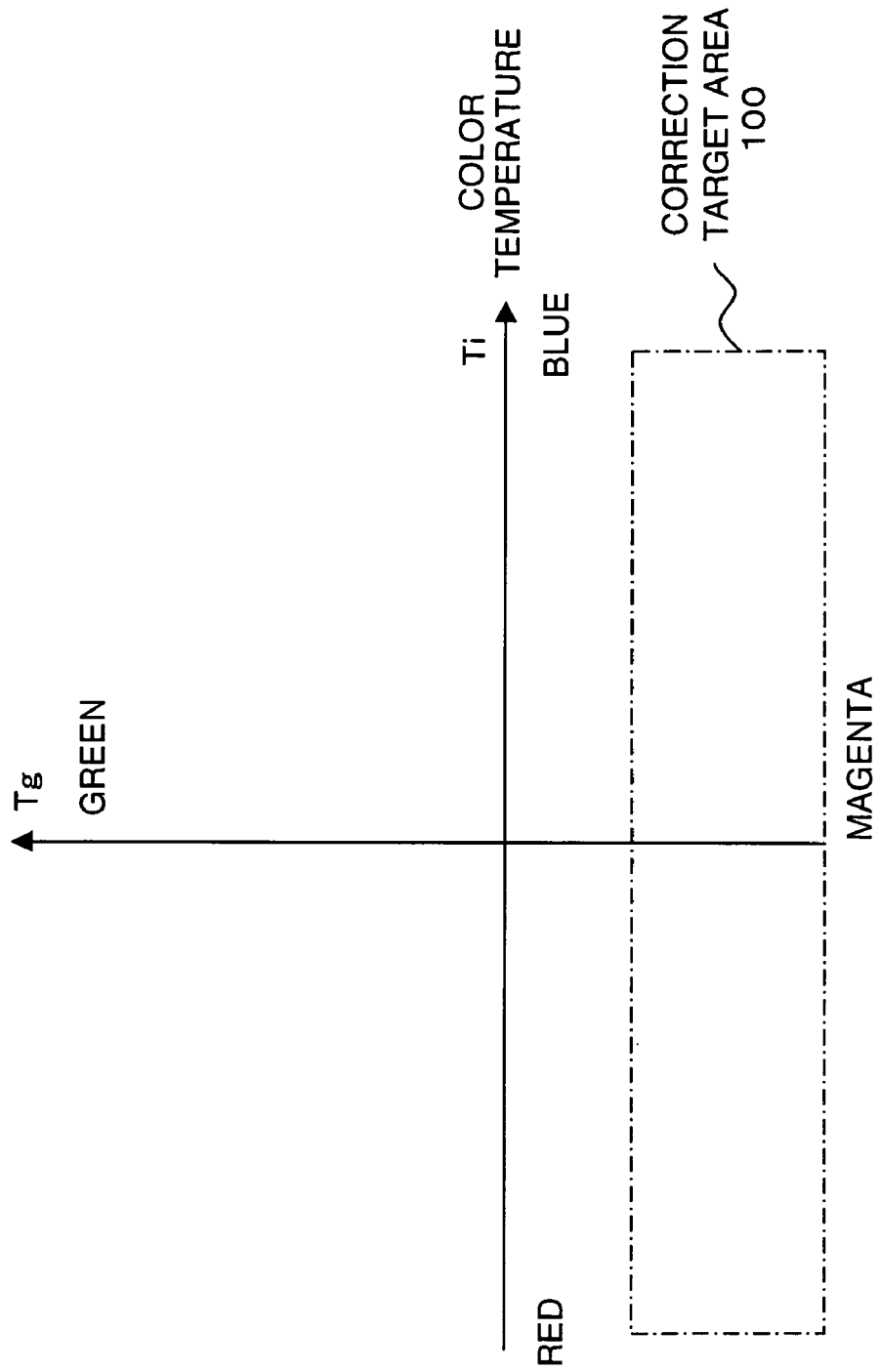
FIG. 5 is a view showing an example area to be corrected in a color difference space.

First, the correction coefficient calculating section 50 sets a counter "n" to an initial value of "1" (S104), and a determination is made as to whether or not the luminance and color difference of a block Bn, which is input from the block division section 41 and is formed from n×m pixels, satisfy predetermined correction target conditions (S106). More specifically, when the typical luminance of the block Bn is equal to or less than predetermined luminance Lt and when the typical color difference of the block Bn is included in a predetermined correction target area 100 in a color-difference space such as that shown in FIG. 5, the correction coefficient calculating section 50 determines the block Bn to be a dark block fulfilling correction target conditions.

After the determination, the correction coefficient calculating section 50 increments the counter Bc (S108) showing the number of dark blocks. After having further incremented the counter "n" (S110), the correction coefficient calculating section 50 determines whether or not there is a block for which a determination has not yet been made as to whether or not the block is a dark block (S112). Specifically, a determination is made as to whether or not the counter "n" is greater than or equal to the total number of blocks N. When a result of determination shows that there is a block for which a determination has not yet been rendered, processing subsequent to step S106 is iterated.

When a determination has been made, in connection with all of the blocks, as to whether or not the block is a dark block (when the result of determination rendered in step S112 is affirmative "Y"), the correction coefficient calculating section 50 determines whether or not the number of dark blocks Bc is equal to or greater than a predetermined threshold number of blocks Bt (S114). Now, the threshold number of blocks Bt is a value equivalent to a proportion of the total number of blocks to the number of dark blocks assuming a value of 50%.

When the result of determination shows that the number of dark blocks Bc is greater than or equal to the predetermined threshold number of blocks Bt (when a result of determination rendered in step S114 is affirmative "Y"), a correction coefficient used for making a correction to white balance gains is calculated (S116). When the number of dark blocks Bc is smaller than the predetermined threshold number of blocks Bt (when the result of determination rendered in step S114 is negative "N"), determination processing is completed.

Subsequently, correction coefficient calculating processing will be described. The present embodiment will be described by means of taking, as an example, a case where the correction coefficient calculating section 50 prevents shifting of an entire dark area in an image to a magenta color, which would otherwise arise when the output level of the R signal and the output level of the B signal become greater than the output level of the G signal in a dark area of the image in spite of white balance adjustment having been performed. In order to make a correction to the magenta color, the output level of the R signal and the output level of the B signal are decreased or the output level of the G signal is increased in such a way that the output level of the R signal and the output level of the B signal coincide with the output level of the G signal. In short, the essential requirement is to increase the ratio G/R of the G component to the R component in the image signal and the ratio G/B of the G component to the B component in the image signal. For simplification of description, the present embodiment is described on the assumption that the output level of the R component of the image signal is identical with the output level of the B component of the same.

More specifically, in the present embodiment, the gain Ggain of the G signal calculated by the white balance gain calculator 46 is multiplied by image-capturing sensitivity, the number of dark blocks, and the correction coefficient $K_G$ determined by firing/non-firing of flash light, thereby increasing the output level of the G signal and causing the output level of the G signal to coincide with the output level of the R signal and the output level of the B signal.

The correction coefficient $K_G$ is expressed by Equation (6) provided below.

$$K_G = K_{G1} + K_{G2} + K_F + 1 \quad (6)$$

Figure 6B:
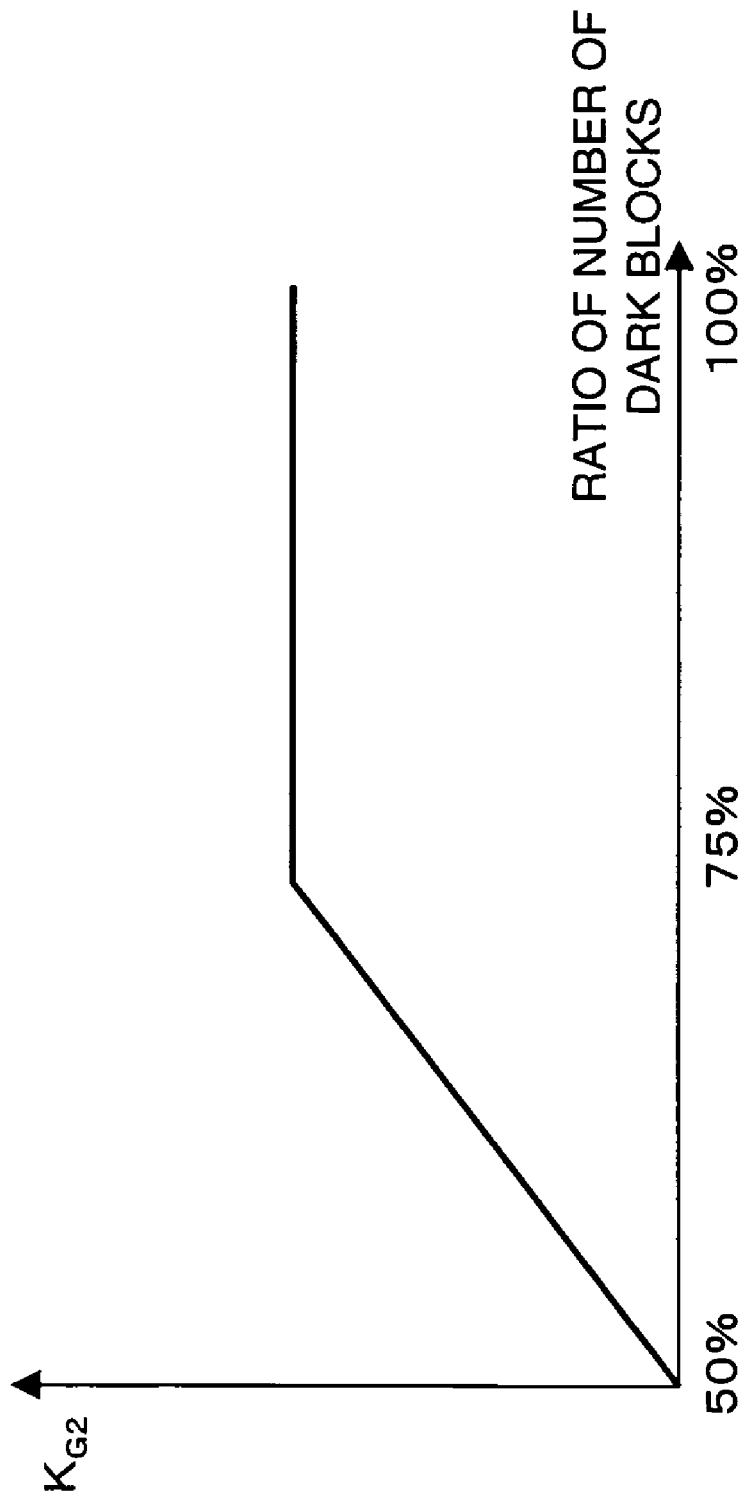
FIG. 6B is a view showing an example reference map to which reference is made when the correction coefficient $K_G$ is determined.

The coefficient $K_{G1}$ is a value determined from image-capturing sensitivity. For instance, the correction coefficient calculating section 50 determines a coefficient $K_{G1}$ corresponding to the image-capturing sensitivity adopted during photography, by reference to a reference map such as that shown in FIG. 6A.

The coefficient $K_{G2}$ is a value determined from a ratio of the total number of blocks to the number of dark blocks. For instance, the correction coefficient calculating section 50 determines a coefficient $K_{G2}$ corresponding to the ratio of the number of dark blocks to the total number of blocks, by reference to a reference map such as that shown in FIG. 6B.

Figure 6C:
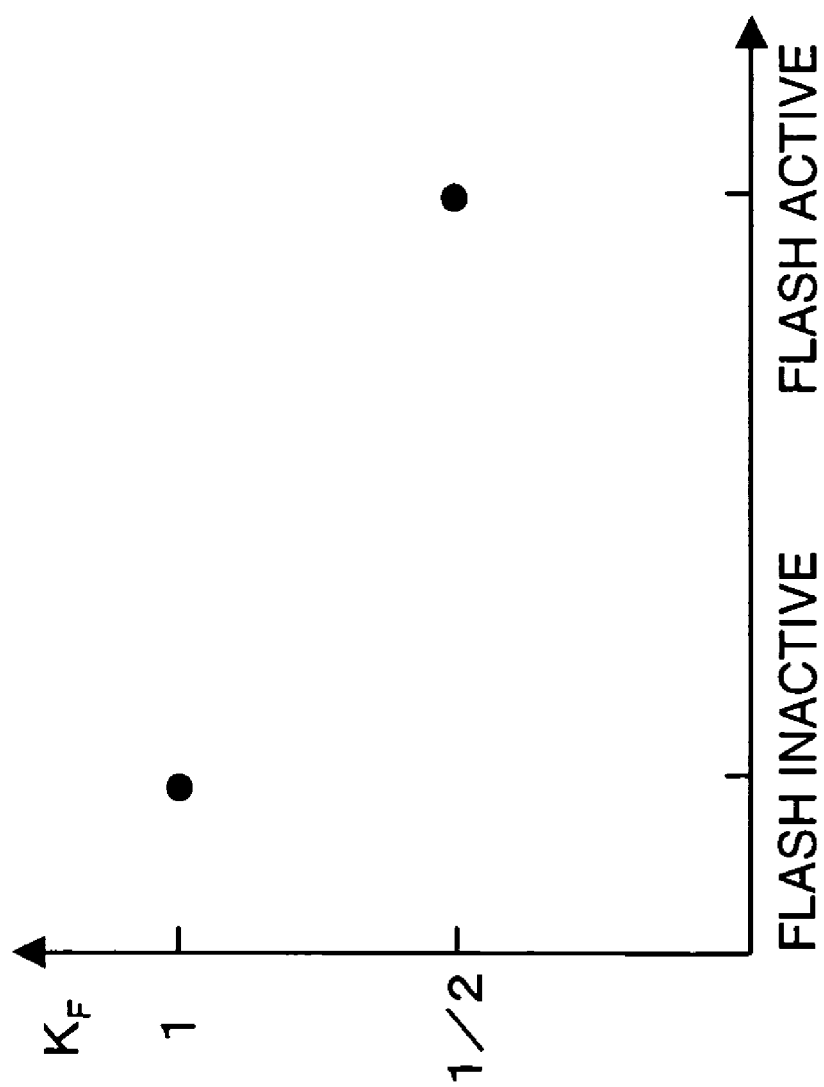
FIG. 6C is a view showing an example reference map to which reference is made when the correction coefficient $K_G$ is determined.

The coefficient $K_F$ is a value determined according to the firing or non-firing of flash light during photography. For instance, the correction coefficient calculating section 50 determines a coefficient $K_F$ corresponding to firing or non-firing of flash light, by reference to a reference map such as that shown in FIG. 6C.

As mentioned above, after having determined coefficients corresponding to the respective parameters, the correction coefficient calculating section 50 determines the correction coefficient $K_G$ according to Equation (6).

For instance, the respective reference maps mentioned above can be prepared as follows. Specifically, a plurality of images whose dark areas have shifted entirely toward magenta color even after having undergone ordinary white balance adjustment are prepared by means of changing various conditions such as image-capturing sensitivity, the ratio of the number of dark blocks, and firing/non-firing of flash light. The respective coefficients $K_{G1}$, $K_{G2}$, and $K_F$ are adjusted such that the magenta color of the respective images is reduced, and white balance gains are adjusted. The results of adjustment are mapped, so that respective reference maps can be prepared.

The correction coefficient calculating section 50 outputs the determined correction coefficient $K_G$ to the white balance gain calculator 46, thereby instructing the white balance gain calculator 46 to make a correction to the gains. When having received an input of the correction coefficient $K_G$ from the correction coefficient calculating section 50, the white balance gain calculator 46 multiplies the calculated gain Ggain by the correction coefficient $K_G$, thereby causing the output level of the G signal to coincide with the output level of the R signal and the output level of the B signal.

Moreover, the white balance gain calculator 46 may divide the calculated gain Rgain of the R signal and the gain Bgain of the B signal by the correction coefficient $K_G$, to thus cause the output level of the R signal and the output level of the B signal to coincide with the output level of the G signal.

Figure 7A:
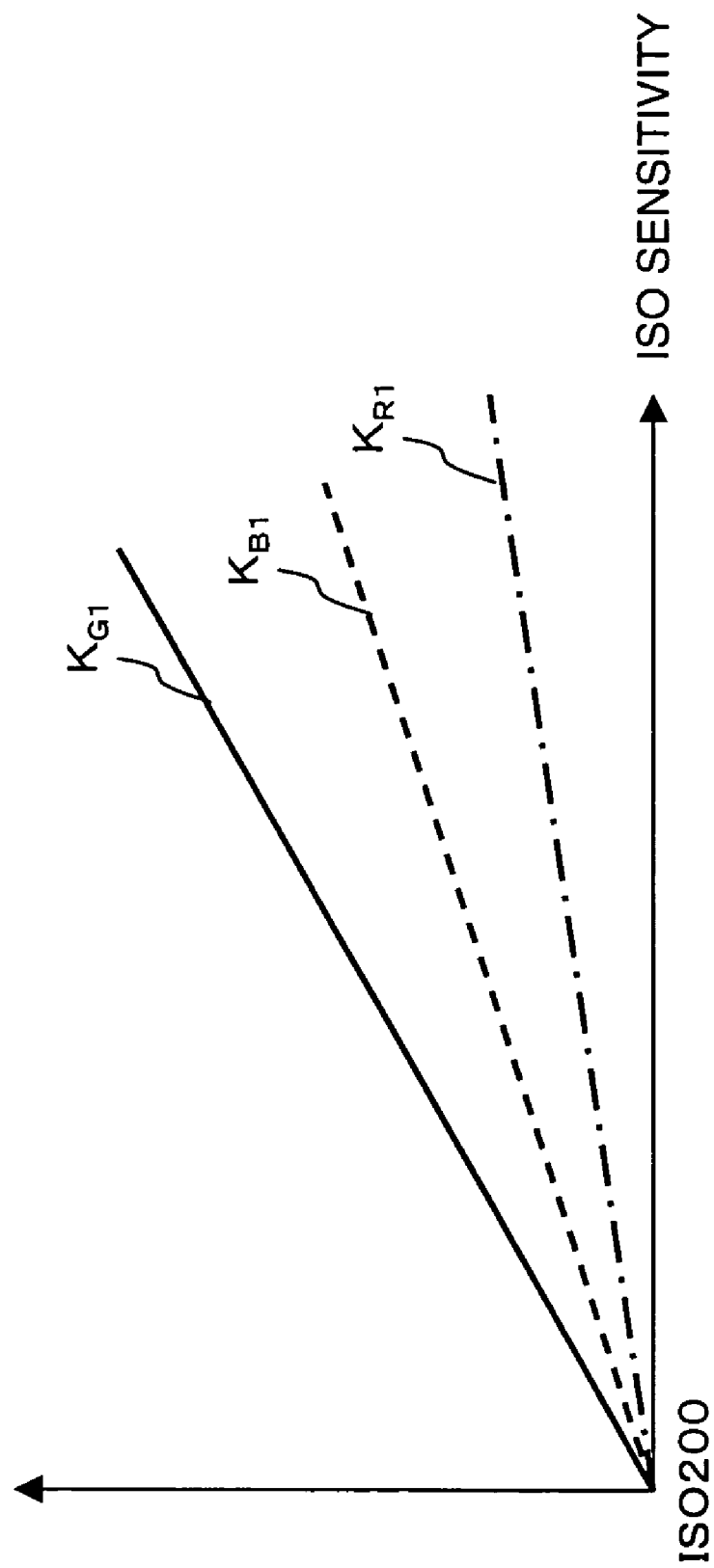
FIG. 7A is a view showing an example reference map to which reference is made when a correction coefficient $K_R$, a correction coefficient $K_G$, and the correction coefficient $K_B$ are determined.
Figure 7B:
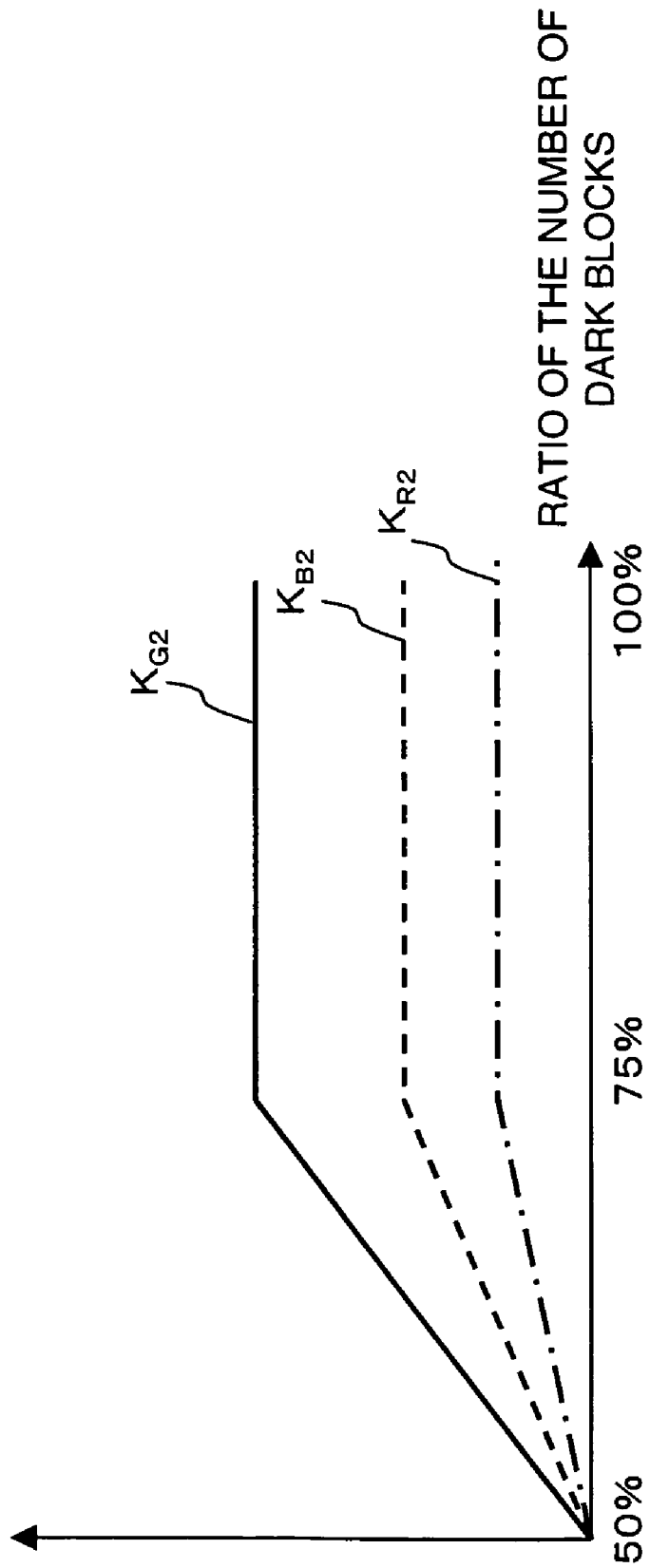
FIG. 7B is a view showing an example reference map to which reference is made when the correction coefficient $K_R$, the correction coefficient $K_G$, and the correction coefficient $K_B$ are determined.

The above descriptions have mentioned the example where only the correction coefficient $K_G$ for the G signal is determined on the assumption that the output level of the R component and the output level of the B component in the image signal are equal to each other. However, as shown in FIG. 3B, the output level of the R component and the output level of the B component in the image signal differ from each other because of a difference between spectral transmittance factors of the color filters. Therefore, as in the case of the correction coefficient $K_G$, the correction coefficient $K_R$ for the R signal and the correction coefficient $K_B$ for the B signal are determined by reference to the reference maps shown in FIGS. 7A and 7B. Correction values (Rgain', Ggain', Bgain') for the white balance gains are determined according to Equation (7) provided below, so that the white balance gains can be corrected with superior accuracy.

$$Rgain' = Rgain * K_R / K_G$$

$$Ggain' = Ggain$$

$$Bgain' = Bgain * K_B / K_G \quad (7)$$

The correction coefficient $K_R$ is expressed by Equation (8) provided below, and the correction coefficient $K_B$ is expressed by Equation (9) provided below.

$$K_R = K_{R1} + K_{R2} + K_F + 1 \quad (8)$$

$$K_B = K_{B1} + K_{B2} + K_F + 1 \quad (9)$$

As mentioned above, according to the present embodiment, a correction is made, in accordance with the correction coefficient, to the white balance gains determined by prioritized use of the color difference of pixels having high luminance levels among all of pixels forming an image. As a result, for instance, even in an image including a dark area in high proportion as in the case of a night view, the color of the dark area can be prevented from shifting toward magenta color by means of white balance adjustment.

In the above embodiment, a determination is made, on the basis of the number of blocks whose luminance and color difference satisfy the predetermined correction target conditions, as to whether or not the block is a correction target image. However, for instance, when the average luminance of an entire image is equal to or less than reference luminance and where an average color difference of the entire image is included in a correction target area in a color-difference space, the image may also be determined to be a correction target image.

PARTS LIST

| | |
|---|---|
| 10 | solid-state imaging sensor |
| 20 | A/D conversion processing section |
| 30 | RGB separation section |
| 40 | white balance processing section |
| 41 | block division section |
| 42 | value calculator |
| 44 | white balance evaluation section |
| 46 | white balance gain calculator |
| 48 | white balance adjustment section |
| 50 | calculating section |
| 60 | image-processing section |
| 70 | control section |
| 100 | correction target area |
| S100 | subject luminance determination |
| S102 | image-capturing sensitivity determination |
| S104 | initial value |
| S106 | correction target condition |
| S108 | increment counter |
| S110 | counter |
| S112 | dark block determination |
| S114 | threshold number of blocks |
| S116 | correction coefficient |

What is claimed is:

1. An image-capturing apparatus comprising:
a solid-state imaging sensor which outputs a signal corresponding to a quantity of incident light;
a white balance gain calculator for calculating white balance gains of an image from color differences of pixels whose luminance is equal to or greater than a reference luminance, in preference to color differences of pixels whose luminance is less than the reference luminance, among all pixels forming the image originating from the output signal;
a white balance adjuster for adjusting white balance of the image in accordance with the calculated gains of white balance; and
a gain correction instructing unit which performs a pixel determination as to whether or not a ratio of dark pixels, among all pixels of the image, whose luminance is lower than the reference luminance and whose color differences fall within a predetermined correction target area in a color-difference space, is greater than or equal to a reference ratio, and instructs the white balance gain calculator to make a correction to the white balance gains in accordance with a predetermined correction coefficient when the ratio of dark pixels is equal to or greater than the reference ratio.

2. The image-capturing apparatus according to claim 1, wherein the correction coefficient is determined from at least one of image-capturing sensitivity corresponding to the image, a proportion of dark pixels, and firing/non-firing of flash light.

3. The image-capturing apparatus according to claim 1, wherein the correction coefficient is determined such that a ratio G/R of a G component to an R component in the image and a ratio G/B of the G component to a B component in the image increase.

4. An image-capturing apparatus comprising:
a solid-state imaging sensor which outputs a signal corresponding to a quantity of incident light;
a white balance gain calculator for calculating white balance gains of an image from at least color differences of pixels whose luminance is equal to or greater than a reference luminance among all pixels forming the image originating from the output signal;
a white balance adjuster for adjusting white balance of the image in accordance with the calculated gains of white balance; and
a gain correction instructing unit which performs a pixel determination as to whether or not a ratio of dark pixels, among all pixels of the image, whose luminance is lower than the reference luminance and whose color differences fall within a predetermined correction target area in a color-difference space, is greater than or equal to a reference ratio, and instructs the white balance gain calculator to make a correction to the white balance gains in accordance with a predetermined correction coefficient when the ratio of dark pixels is equal to or greater than the reference ratio, wherein,
the gain correction instructing unit does not perform the pixel determination for determining whether or not there is issued an instruction for making a correction to the white balance gains when image-capturing sensitivity corresponding to the image is lower than reference image-capturing sensitivity.

5. An image-capturing apparatus comprising:
a solid-state imaging sensor which outputs a signal corresponding to a quantity of incident light;
a white balance gain calculator for calculating white balance gains of an image from at least color differences of pixels whose luminance is equal to or greater than a reference luminance among all pixels forming the image originating from the output signal;
a white balance adjuster for adjusting white balance of the image in accordance with the calculated gains of white balance; and
a gain correction instructing unit which performs a pixel determination as to whether or not a ratio of dark pixels, among all pixels of the image, whose luminance is lower than the reference luminance and whose color differences fall within a predetermined correction target area in a color-difference space, is greater than or equal to a reference ratio, and instructs the white balance gain calculator to make a correction to the white balance gains in accordance with a predetermined correction coefficient when the ratio of dark pixels is equal to or greater than the reference ratio, wherein,
the gain correction instructing unit does not perform the pixel determination for determining whether or not there is issued an instruction for making a correction to the white balance gains when subject luminance of the image is greater than reference subject luminance.

6. A white balance processing apparatus comprising:
a white balance gain calculator for calculating white balance gains of an image from color differences of pixels whose luminance is equal to or greater than a reference luminance, in preference to color differences of pixels whose luminance is less than the reference luminance, among all pixels forming the image originating from a signal output from a solid-state imaging sensor in accordance with a quantity of incident light;

a white balance adjuster for adjusting white balance of the image in accordance with the calculated gains of white balance; and a gain correction instructing unit for instructing the white balance gain calculator to make a correction to the white balance gains in accordance with a predetermined correction coefficient when a ratio of dark pixels, whose luminance is lower than the reference luminance and color differences fall within a predetermined correction target area of a color-difference space, to all pixels of the image is equal to or greater than a reference ratio.

7. An image-capturing apparatus comprising:

a solid-state imaging sensor which outputs a signal corresponding to a quantity of incident light;

a white balance gain calculator for calculating white balance gains of an image from color differences of pixels whose luminance is equal to or greater than a reference luminance, in preference to color differences of pixels whose luminance is less than the reference luminance, among all pixels forming the image originating from the output signal;

a white balance adjuster for adjusting white balance of the image in accordance with the calculated gains of white balance; and a gain correction instructing unit which performs a pixel determination as to whether or not a ratio of dark pixels, among all pixels of the image, whose luminance is lower than the reference luminance, is greater than or equal to a reference ratio, and instructs the white balance gain calculator to make a correction to the white balance gains in accordance with a predetermined correction coefficient when the ratio of dark pixels is equal to or greater than the reference ratio.

8. A white balance processing apparatus comprising:

a white balance gain calculator for calculating white balance gains of an image from color differences of pixels whose luminance is equal to or greater than a reference luminance, in preference to color differences of pixels whose luminance is less than the reference luminance, among all pixels forming the image originating from a signal output from a solid-state imaging sensor in accordance with a quantity of incident light;

a white balance adjuster for adjusting white balance of the image in accordance with the calculated gains of white balance; and a gain correction instructing unit for instructing the white balance gain calculator to make a correction to the white balance gains in accordance with a predetermined correction coefficient when a ratio of dark pixels, whose luminance is lower than the reference luminance, to all pixels of the image is equal to or greater than a reference ratio.

9. A white balance processing apparatus comprising:

a white balance gain calculator for calculating white balance gains of an image from at least color differences of pixels whose luminance is equal to or greater than a reference luminance among all pixels forming the image originating from a signal output from a solid-state imaging sensor in accordance with a quantity of incident light;

a white balance adjuster for adjusting white balance of the image in accordance with the calculated gains of white balance; and a gain correction instructing unit which performs a pixel determination as to whether or not a ratio of dark pixels, among all pixels of the image, whose luminance is lower than the reference luminance and whose color differences fall within a predetermined correction target area in a color-difference space, is greater than or equal to a reference ratio, and instructs the white balance gain calculator to make a correction to the white balance gains in accordance with a predetermined correction coefficient when the ratio of dark pixels is equal to or greater than the reference ratio, wherein, the gain correction instructing unit does not perform the pixel determination for determining whether or not there is issued an instruction for making a correction to the white balance gains when image-capturing sensitivity corresponding to the image is lower than reference image-capturing sensitivity.

10. A white balance processing apparatus comprising:

a white balance gain calculator for calculating white balance gains of an image from at least color differences of pixels whose luminance is equal to or greater than a reference luminance among all pixels forming the image originating from a signal output from a solid-state imaging sensor in accordance with a quantity of incident light;

a white balance adjuster for adjusting white balance of the image in accordance with the calculated gains of white balance; and a gain correction instructing unit which performs a pixel determination as to whether or not a ratio of dark pixels, among all pixels of the image, whose luminance is lower than the reference luminance and whose color differences fall within a predetermined correction target area in a color-difference space, is greater than or equal to a reference ratio, and instructs the white balance gain calculator to make a correction to the white balance gains in accordance with a predetermined correction coefficient when the ratio of dark pixels is equal to or greater than the reference ratio, wherein, the gain correction instructing unit does not perform the pixel determination for determining whether or not there is issued an instruction for making a correction to the white balance gains when subject luminance of the image is greater than reference subject luminance.

* * * * *